United States Patent [19]

Godtfredsen et al.

[11] Patent Number: 4,708,875

[45] Date of Patent: Nov. 24, 1987

[54] PRODUCTION OF FERMENTED ALCOHOLIC PRODUCTS HAVING A LOW DIACETYL CONTENT

[75] Inventors: Sven E. Godtfredsen, Kirke Vaerløse; Martin Ottesen, Valby; Bent A. Larsen, Charlottenlund, all of Denmark

[73] Assignee: De Forenede Bryggerier A/S, Copenhagen, Denmark

[21] Appl. No.: 361,930

[22] PCT Filed: Aug. 6, 1981

[86] PCT No.: PCT/DK81/00076

§ 371 Date: Mar. 15, 1982

§ 102(e) Date: Mar. 15, 1982

[87] PCT Pub. No.: WO82/00474

PCT Pub. Date: Feb. 18, 1982

[30] Foreign Application Priority Data

Aug. 7, 1980 [DK] Denmark .............................. 3398/80

[51] Int. Cl.$^4$ ...................... C12C 11/00; C12G 1/00; C12N 11/16
[52] U.S. Cl. ........................................ 426/12; 426/13; 426/15; 426/16; 435/174
[58] Field of Search ...................... 426/12, 13, 15, 16; 435/174

[56] References Cited

U.S. PATENT DOCUMENTS 3,130,055  4/1964  Segel et al. .................. 426/16 X
3,733,205  5/1973  Shovers et al. ................ 426/12 X

FOREIGN PATENT DOCUMENTS 1445083  8/1976  United Kingdom .

OTHER PUBLICATIONS

Amerine et al., The Technology of Wine Making 3rd, ed., The Avi Publishing Co. Inc., Westport, Conn. 1972 (pp. 284–287 & 204–207).
Loken, et al., Acetolactate Decarboxylase from *Aerobacter aerogenes,* Eur. J. Biochem. vol. 14, 1970 (pp. 133–137).
Juni, E., Mechanisms of Formation of Acetoin by Bacteria, Chemical Abstracts, 1953, 10053(d).
Hill, et al., Stereochemistry of Valine and Isoleucine Biosynthesis, Bioorganic Chemistry, vol. 8, 1979 (pp. 175–189).

*Primary Examiner*—David M. Naff
*Attorney, Agent, or Firm*—Ladas & Parry

[57] ABSTRACT

Fermented alcoholic products such as wine and beer are produced having a low diacetyl content by decomposing acetolactate with an enzyme. The enzyme is preferably acetolactate decarboxylase contained by *Aerobacter aerogenes.* The enzyme, in free or immobilized state, may be added during main fermentation or after main fermentation during maturation such as when carrying out malo-lactic fermentation.

11 Claims, No Drawings

PRODUCTION OF FERMENTED ALCOHOLIC PRODUCTS HAVING A LOW DIACETYL CONTENT

The present invention relates to a process for producing fermented alcoholic products with a low diacetyl content by fermentation of a carbohydrate containing substrate with a microorganism.

When carbohydrate containing substrates, such as wort or grape juice, are fermented with yeast or other microorganisms, various processes take place in addition to the alcohol fermentation which may cause generation of undesired by-products. An example is the formation of diacetyl which has a strong and unpleasant smell even in very low concentrations.

Alcoholic beverages, such as beer or wine, may thus have an unacceptable aroma and flavour if the content of diacetyl considerably exceeds certain limits which, in the case of beer, is about 0.1 ppm.

Formation of diacetyl is also disadvantageous in the industrial production of ethanol because it is difficult to separate diacetyl from ethanol by distillation. A particular problem arises in the preparation of absolute ethanol where ethanol is dehydrated by azeotropic distillation with benzene. Diacetyl will accumulate in the benzene phase during the azeotropic distillation which may give rise to mixtures of diacetyl and benzene which makes it difficult to recover the benzene used for the azeotropic distillation.

The conventional brewing of beer comprises fermenting the wort with a suitable species of yeast, such as *Saccharomyces cerevislae* or *Saccharomyces carlsbergensis*.

The fermentation is usually effected in two steps, viz. a main fermentation of a duration of normally 7 to 10 days and a secondary fermentation—a so-called maturation process—which may take from 3 to 12 weeks. During the main fermentation most of the carbohydrates in the wort are converted to ethanol and carbon dioxide. Maturation is effected at a low temperature in the presence of a small residual amount of yeast. The purposes of the maturation are i.a. to precipitate undesirable, high molecular weight compounds and to convert diacetyl, 2,3-pentanedione, α-acetolactate and α-aceto-α-hydroxybutyrate to compounds, such as diols, which do not affect flavour and aroma. For example butanediol, the final product of the conversion of α-acetolactate and diacetyl in beer, does not affect flavour and aroma in concentrations below 500 mg per liter.

The enzymatic and chemical reactions important to the diacetyl content in beer is illustrated in the following scheme:

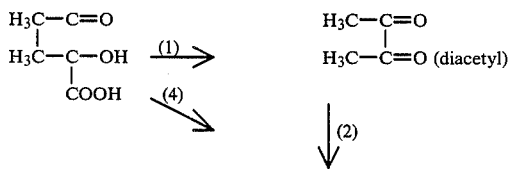

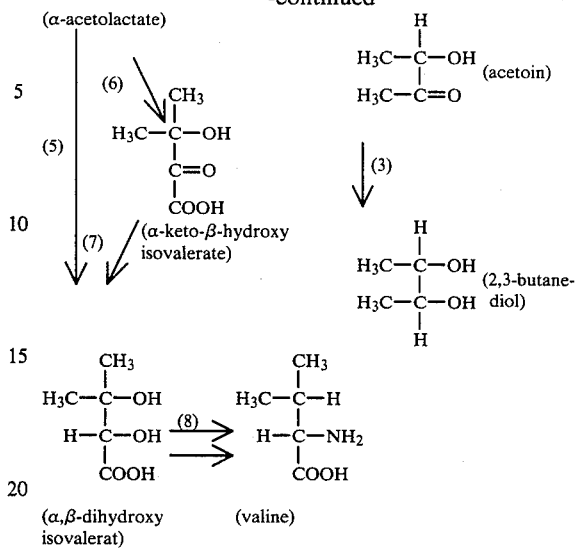

The precursor of diacetyl, α-acetolactate, is generated in the fermenting yeast by enzyme catalyzed condensation of pyruvate and the thiamine pyrophosphate of acetaldehyde and is an intermediate in the biosynthesis of the amino acid valine. α-Acetolactate may, however, also decompose spontaneously by oxidative decarboxylation to provide diacetyl [reaction (1)] which is subsequently reduced by reductases in the yeast cells, present during the beer maturation process. The decarboxylation of α-acetolactate is a temperature dependent reaction which proceeds relatively slowly at low temperatures, whereas the subsequent conversion of diacetyl to acetoin and 2,3-butanediol proceeds relatively fast, the consequence being that the rate determining step in removal of α-acetolactate and diacetyl from beer is the decarboxylation of the diacetyl precursor. Quite similarly, the rate determining step in removal of 2,3-pentanedione and α-aceto-α-hydroxy-butyrate is the spontaneous decarboxylation of the 2,3-pentanedione precursor.

To obtain maximum precipitation of high molecular weight substances and a beer of satisfactory quality, the maturation should take place at a temperature as low as possible, such as at about 0° C. At this temperature it may take several months before the acetolactate has been completely removed and the resulting diacetyl has been reduced by the yeast. The maturation time may be reduced, however, if the process is allowed to proceed at higher temperatures, e.g. 1 or 2 weeks at 10° C., 1 or 2 weeks at 5 C. and 1 or 2 weeks at −1° C. Such a procedure will accelerate the conversion of acetolactate to diacetyl.

In connection with accelerated beer brewing processes it has been proposed to accelerate the decomposition of acetolactate and α-aceto-α-hydroxy-butyrate by heating the beer briefly to 60° C. or 80° C., see J. Inst. Brew., Vol. 79, 1973, p. 43–44. Reaction (1) may essentially be terminated in the course of 4 to 15 minutes at these temperatures. Flavour and aroma, however, will be adversely affected to some extent by such a rough treatment. Nor is the heat treatment suitable for conventional beer brewing processes, and, moreover, it is inconvenient and economically disadvantageous to heat and recool large amounts of beer between the main fermentation and maturation, also because all the yeast has to be removed prior to the heat treatment and fresh yeast has to be added after the heat treatment and cooling to convert diacetyl to butanediol.

The present invention is based on the discovery that the slow decomposition of acetolactate to diacetyl, reaction (1) in the scheme, may be avoided by using enzymes to decompose acetolactate. In principle, any enzyme that causes conversion of acetolactate may be used for this purpose. A case in point is decarboxylation of acetolactate to acetoin, see reaction (4) in the above-mentioned scheme.

Other examples are the conversion of acetolactate to α-keto-β-hydroxy isovalerate with an isomerase reaction (6) or the conversion of acetolactate to α, β-dihydroxy isovalerate with a reducto-isomerase reaction (5). The reaction products in both reactions are precursors for the amino acid valine.

The process of the invention is thus characterized by the treatment of a substrate with an acetolactate converting enzyme during or in continuation of a fermentation. An example of a suitable enzyme for this process is acetolactate decarboxylase, which may be recovered from the microorganism Aerobacter aerogenes. This enzyme is described by E. Juni in J. Biol. Chem., Vol. 195 (1952), p. 715-734. However, it could not be predicted that the enzyme might advantageously be used in fermentation processes, such as fermentation of wort, for the brewing of beer with a low diacetyl content.

In an embodiment of the process of the invention acetolactate is enzymatically decarboxylated to acetoin, the result being that formation of the strongly smelling and undesirable diacetyl from acetolactate is avoided. Similarly, in other embodiments, decomposition of α-acetolactate to diacetyl is avoided by conversion of the diacetyl precursor with the aid of acetolactate reductoisomerases or isomerases (reactions 5 and 6).

The process may be carried out in connection with conventional brewing of beer. For example, acetolactate decarboxylase may be added during the main fermentation or during the process of maturation. The use of this enzyme provides for a significant shortening of the maturation process as acetolactate is rapidly decarboxylated to fermentable acetoin without any formation of diacetyl. According to a particular embodiment of the invention the enzyme is added during the maturation process, the formation of acetolactate having essentially ended after the main fermentation. However, if desired, the enzyme may be added before or during the main fermentation where the pH is higher than during the maturation process.

Instead of using the enzyme in a free state, it may be used in an immobilized state, the immobilized enzyme being added to the wort during or in continuation of the fermentation. The immobilized enzyme may also be maintained in a column through which the fermenting wort or the beer is passed. The enzyme may be immobilized separately, or coimmobilized yeast cells and acetolactate decarboxylase may be used.

The use of an immobilized enzyme allows an accelerated continuous brewing of beer as the beer fermentation may be effected by passing the wort through columns containing immobilized yeast and immobilized enzymes, optionally in a coimmobilized state. In that case the main fermentation and the maturation process are combined to a continuous conversion of wort to finished beer, the capacity depending upon the volume and diameters of the columns. Such a process saves labour and reduces production plant investments.

The process of the invention can not only be used in connection with the brewing of beer, but is also suitable for the production of wine where similar advantages are obtained, in particular a reduction in the maturation period and a simplification of the process. Of special interest in this context is the use of acetolactate converting enzymes in connection with the so-called malo-lactic fermentation. This process which is effected by microorganisms as species of Leuconostoc, Lactobacillus or Pediococcus is carried out after the main fermentation of wine in order to increase the pH of the product as well as its biological stability and to develop the flavour of the wine. Moreover, it is highly desirable to carry out the fermentation since it makes possible rapid bottling and thereby improves the cash-flow of wineries substantially. Unfortunately, however, the process may give rise to off-flavours due to diacetyl, the formation of which can be reduced with the aid of acetolactate converting enzymes. Further, the process can be used to advantage for industrial preparation of ethanol as fermentation products are obtained without or practically without any content of diacetyl, which simplifies the distillation process, especially in case of azeotropic distillation for the preparation of absolute ethanol, i.e. pure anhydrous ethanol.

As mentioned, in the present process there may be used an acetolactate decarboxylase which has e.g. been isolated from Aerobacter aerogenes. However, use may also be made of acetolactate converting enzymes from other sources, e.g. species of Bacillus, Enterobacter, Klebsiella, Leuconostoc, Serratia and Streptococcus, and some species of Actinomycetes and fungi.

Suitable acetolactate reducto-isomerases and isomerases may be isolated from bacteria, such as species of *E. coli* or *Aerobacter aerogenes,* or from *Neurospora crassa,* yeasts, Salmonella or plants. As the enzymes in question are enzymes in amino acid metabolism it must be expected that they occur in almost all living cells.

As alcohol fermentation processes often proceed at pH values ranging from 4 to 5, and many readily available acetolactate decarboxylases recovered from microorganisms have optimum stability and activity at pH values above 5, it is expedient according to the invention to use acetolactate decarboxylase in a chemically modified state to obtain a great stability and/or optimum activity in a pH range between 4 and 5. Such modification may e.g. be obtained as stated in Biochem., Vol. 11, No. 22, 1972.

The processes of the invention will be illustrated below by means of some examples.

EXAMPLE 1

Batchwise fermentation and rápid maturation of beer using acetolactate decarboxylase 1 liter of sterile wort of a wort strength of 10.7° P was inoculated with brewer's yeast (*Saccharomyces carlsbergensis*) in an amount of $20 \times 10^6$ cells per ml. After 6 days at 10° C. the main fermentation was finished, the attenuation (apparent extract) of the beer being measured to be 2.0° P. The content of free and bound diacetyl (i.e. diacetyl derived from α-acetolactate) in the beer were measured to be 0.12 ppm and 0.71 ppm, respectively (cf. Haukeli, A.D. and Lie S.: Journal of the Institute of Brewing 1971, 77, 538).

The beer was then decanted from precipitated yeast and admixed with 100 ml of "Kreuzen", i.e. vigorously fermenting beer, produced from wort inoculated with yeast 48 hours before. Moreover, 25 mg of acetolactate decarboxylase isolated from *Aerobacter aerogenes* as described in European Journal of Biochemistry 1970, 14, 133 were added. On 24 hours' standing at 10° C. for secondary fermentation and maturation the beer content of free and bound diacetyl were determined to be 0.05 ppm and 0.10 ppm, respectively. The beer was then cooled to −1° C. and left to stand for another 2 days at this temperature, and the finished beer was then filtered.

EXAMPLE 2

Continuous fermentation and rapid maturation of beer 350 g of brewer's yeast (*Saccharomyces carlsbergensis*) isolated by centrifugation were suspended in 350 ml of a 3% sterile solution of sodium alginate. The mixture was dropwise added to 10 liters of sterile 0.1 M CaCl$_2$ to gelatinize calcium alginate to form spherical, yeast containing particles of a diameter of about 3 mm.

These were left to stand in the calcium chloride solution for 12 hours at 4° C. and then packed into a column of a diameter of 19 cm and a height of 5 cm. Sterile wort was pumped through this reactor at 10° C. at a rate of 0.15 liter per hour, the wort strength being 10,7° P. The attenuation in the eluate from the reactor was found to be 2.1° P., and gas chromatography showed a content of free and bonded diacetyl of 0.15 ppm and 2.21 ppm, respectively. To 1 liter of beer from the reactor were added 25 mg of acetolactate decarboxylase produced as described in example 1. The beer was left to stand at 10° C. for 24 hours and then pumped through another reactor with immobilized yeast so that the residence time was 5 hours. The content of free and bonded diacetyl in the eluate were determined to be 0.05 ppm and 0.10 ppm, respectively. The temperature was then lowered to −1° C., and on standing for 2 days at this temperature the finished beer was decanted from precipitated material and finally filtered.

EXAMPLE 3

Batchwise fermentation and rapid maturation of beer using acetolactate reducto-isomerase 1 liter of sterile wort was fermented with *Saccharomyces carlsbergensis* as described in example 1. After 6 days' main fermentation the beer content of free and bonded diacetyl were measured to be 0.10 ppm and 0.61 ppm, respectively. The beer was then decanted from the precipitated yeast, and 100 ml of "Kreuzen" were added as described in example 1 together with 100 mg of an α-acetolactate reducto-isomerase produced from *E. coli* as described by H. E. Umbarger, B. Brown and E. J. Eyring in Journal of Biological Chemistry, Vol. 235, p. 1425–1432. The beer was then left to stand for another 24 hours at 10° C., following which its content of free and bonded diacetyl were determined to be 0.03 ppm and 0.09 ppm, respectively. The beer was then cooled to −1° and stood for another 2 days at this temperature, and then the finished beer was filtered.

We claim:

1. A process for producing fermented alcoholic products with a low diacetyl content comprising fermenting a carbohydrate-containing substrate with a microorganism in a main fermentation and treating said substrate during or after said main fermentation with an acetolactate converting enzyme.

2. A process according to claim 1, wherein said acetolactate converting enzyme is an acetolactate decarboxylase.

3. A process according to claim 2, wherein said acetolactate carboxylase is recovered from the microorganism *Aerobacter aerogenes*.

4. A process to claim 1, wherein said acetolactate converting enzyme is an isomerase.

5. A process according to claim 1, wherein said acetolactate converting enzyme is a reducto-isomerase.

6. A process according to claim 1, wherein said fermenting further comprises a subsequent maturation, said treating with an acetolactate converting enzyme being carried out during said maturation.

7. A process according to claim 6, wherein the substrate is wort.

8. A process according to claim 6, wherein said process is carried out for the production of wine, said maturation comprising a malo-lactic fermentation during which said treating is carried out.

9. A process according to any one of claims 1–8, wherein said acetolactate converting enzyme is in an immobilized state.

10. A process according to claim 9, wherein said acetolactate converting enzyme is in the form of a co-immobilisate with yeast.

11. A process according to claim 1, wherein said acetolactate converting enzyme is acetolactate decarboxylase in a chemically modified form exhibiting high stability, optimum activity in a pH range between 4 and 5 or both.

* * * * *